United States Patent [19]

Yamagami

[11] Patent Number: 4,479,192

[45] Date of Patent: Oct. 23, 1984

[54] STRAIGHT LINE COORDINATES GENERATOR

[75] Inventor: Nobuhiko Yamagami, Fuchu, Japan

[73] Assignee: Tokyo Shibaura Denki Kabushiki Kaisha, Kawasaki, Japan

[21] Appl. No.: 341,579

[22] Filed: Jan. 21, 1982

[30] Foreign Application Priority Data

Jan. 21, 1981 [JP] Japan .................................. 56-7544
Jan. 21, 1981 [JP] Japan .................................. 56-7546

[51] Int. Cl.³ ............................................ G06F 3/153

[52] U.S. Cl. .................................... 364/719; 364/520; 364/521; 340/722; 340/744; 340/753

[58] Field of Search ....................... 364/521, 520, 719; 340/722, 753, 744

[56] References Cited

U.S. PATENT DOCUMENTS 3,591,780 7/1971 Rosenfeld .......................... 364/520
4,272,808 6/1981 Hartwig ............................. 364/719

OTHER PUBLICATIONS

"Principles of Interactive Computer Graphics" by William M. Newman and Robert F. Sproull, McGraw-Hill, 1979, pp. 20-27.
Hewlett-Packard Journal, Jan. 1978.

*Primary Examiner*—Gareth D. Shaw
*Assistant Examiner*—Karl Huang
*Attorney, Agent, or Firm*—Oblon, Fisher, Spivak, McClelland & Maier

[57] ABSTRACT

A new and improved straight line coordinates generator to determine and generate the coordinates of a group of lattice points $[P_k(k=1, 2, \ldots, n-1)]$ to simulate an actual line defined by connecting the two lattice points $P_O(X_o, Y_o)$ and $P_n(X_n, Y_n)$, on a secondary coordinates face comprises registers, adders, comparators, a clock generator gate circuit, X-coordinate counter for determining X-coordinate values, Y-coordinate counter for determining Y-coordinate values, an initializing device for setting the registers with initial normalizing values and a generator for sequentially generating each X and Y coordinate of the lattice points to simulate the line. The circuit arrangement of the straight line coordinates generator is simplified by eliminating the need for decimal points in determining the coordinates of the lattice points to be lightened or highlighted to form the simulated line.

7 Claims, 4 Drawing Figures

STRAIGHT LINE COORDINATES GENERATOR

BACKGROUND OF THE INVENTION

1. Field of the Invention

This invention relates to a straight line coordinates generator, and more particularly to a device which generates coordinates for a group of lattice points to simulate a straight line connecting two points.

2. Description of the Prior Art

The raster scan type graphic display device using a CRT monitor performs some basic operations to write a straight line connecting two points on the screen. The CRT monitor shoots an electron beam on the fluorescent screen to lighten predefined lattice points. Therefore, the raster scan type CRT monitor is principally limited to use of the predefined lattice points along its horizontal and vertical scan lines to generate a straight line between the two points, by defining the group of lattice points which must be lightened. When the CRT monitor displays a straight line, defined by the equation $y=(Y/Z)x+a$, connecting two points $P_0$ and $P_n$, it needs to simulate the line by continuously lightening the lattice points closest to the actual line. Therefore, the monitor must be provided with all of the coordinates of the group of lattice points to lighten in order to simulate the actual line.

In general, a secondary coordinates face is considered to have a group of lattice points spaced a constant one unit distance from each other. A simulated lattice point has a position $x=x_k$ on the line which is the nearest lattice point position corresponding to the actual position $x=x_k$ on the line $y=(Y/X)x+a$ within the group of lattice points on the Y axis in the position $x=x_k$. Therefore, as shown in FIG. 1 to simulate position Q on the corresponding line $y=(Y/X)x+a$ to the position $x=x_k$, the lattice point $P_k$ $(x_k, y_k)$ must be selected from one of the two points P or P' whichever is nearest to the position Q on the Y axis. When the position Q is closer to the point P it becomes the simulated point $P_k$, while when the position Q is closer to the point P', it becomes the simulated point $P_k$. If the Y coordinate of the position Q is y and if the Y coordinates of the two points P and P' are n and n+1 respectively wherein n is an integer, the Y coordinate $y_k$ of the lattice point $P_k$ $(x_k, y_k)$ to simulate the position Q on the line $y=(Y/X)x+a$ corresponding to the line $x=x_k$ is determined by the following equations.

$$\text{if } n \leqq y < n+\tfrac{1}{2} \quad y_k = n \tag{1}$$

$$\text{if } n+\tfrac{1}{2} \leqq y \leqq n+1 \quad y_k = n+1 \tag{2}$$

The above equations define that the simulated point $P_k$ will be the point P if the position Q is between the point P and a point midway between the points P and P', so called the comparative point, and that the simulated point $P_k$ will be the point P' if the position Q is between the point P' and the comparative point. In FIG. 1 it is apparent that the point P' becomes the simulated point $P_k$.

A more detailed method to define each coordinate $(x_k, y_k)$ of the group of the lattice points $[P_k(k=1, 2, \ldots, n-1)]$ simulating the line $y=(Y/K)x+a(0 \leqq Y/K \leqq 1)$ to connect the given two points $P_0$ and $P_n$ will be explained hereinafter. If the slope Y/X is defined such that $0 \leqq Y/x \leqq 1$, the Y coordinate of the next lattice point to the previously defined lattice point on the Y axis (assuming the X coordinate of the next lattice point is a positive one unit greater than the X coordinate of the previously defined lattice point) will be either equal to or will be one unit greater than the Y coordinate of the previously defined lattice point. Namely, if the coordinates of the previously defined lattice point are $(x_{(k-1)}, y_{(k-1)})$, the coordinates $(x_k, y_k)$ of the next lattice point $P_k$ are one of the following set of coordinates:

$$x_k = x_{(k-1)}+1, \ y_k = y_{(k-1)} \tag{3}$$

$$x_k = x_{(k-1)}+1, \ y_k = y_{(k-1)}+1 \tag{4}$$

If any coordinate of the group of the lattice points which simulate the line requires movement along the X axis in the negative direction, the sign may be changed to minus instead of plus.

The following explanation herein assumes the lattice points will only require movement along the X axis in the positive direction. The next lattice point $P_k$ to be required is on the Y axis whose X coordinate is $x=x_k$. If the Y coordinate has a true value $f_k$ on the line at $x=x_k$, it might satisfy the equation $y_{(k-1)} \leqq f_k \leqq y_{(k-1)}+1$. The Y coordinate $y_{(k-1)}$ of the new lattice point $P_{(k-1)}$ corresponds to the n of the equations (1) and (2), and the $f_k$ also corresponds to the y. Instead of the equations (1) and (2) it can also be expressed as follows:

$$\text{if } y_{(k-1)} \leqq f_k \leqq y_{(k-1)}+\tfrac{1}{2} \quad y_k = y_{(k-1)} \tag{5}$$

$$\text{if } y_{(k-1)}+\tfrac{1}{2} \leqq f_k \leqq y_{(k-1)}+1 \quad y_k = y_{(k-1)}+1 \tag{6}$$

As explained above, where the $f_k$ satisfies the equation $y_{(k-1)} \leqq f_k \leqq y_{(k-1)}+1$, it is necessary to know whether $f_k$ is smaller or larger than $y_{(k-1)}+\tfrac{1}{2}$ in order to determine the Y coordinate of the point $P_k$.

$$\text{if } f_k < y_{(k-1)}+\tfrac{1}{2} \quad y_k = y_{(k-1)} \tag{7}$$

$$\text{if } f_k \leqq y_{(k-1)}+\tfrac{1}{2} \quad y_k = y_{(k-1)}+1 \tag{8}$$

Now if the term gk is introduced as follows:

$$g_{(k-1)} = y_{(k-1)}+\tfrac{1}{2} \tag{9}$$

Then the equations (7) and (8) become $$\text{if } f_k < g_{(k-1)} \quad y_k = y_{(k-1)} \tag{10}$$

$$\text{if } f_k \leqq g_{(k-1)} \quad y_k = y_{(k-1)}+1 \tag{11}$$

The term $g_{(k-1)}$ is called the comparative value of the comparative point $C_k$ at $x=x_k$.

It is apparent as mentioned above that if it is necessary to generate all of the coordinates $(x_k, y_k)$ of the group of the lattice points $[P_k(k=1, 2 \ldots n-1)]$ to simulate the line $y=(Y/X)x+a(0 \leqq Y/X \leqq 1)$ connecting the given two points $P_0$ and $P_n$, the value $f_k$ of the Y coordinates on the line at $x=x_k$ and the comparative value $g_{(k-1)}$ of the comparative point $C_k$ at $x=x_k$ may be compared to test if $f_k$ is larger or smaller than $g_{(k-1)}$. It is apparent herein from the equation (9) that the comparative value $g_{(k-1)}$ is equal to the value of the Y coordinate $y_{(k-1)}$ of the previous simulated lattice point $P_{(k-1)}$ with $\tfrac{1}{2}$ added to it.

In view of the aforementioned explanation, the determination of the straight line coordinates, by the prior art will be discussed hereunder. For example, the coordinates $(x_k, y_k)$ of a group of lattice points $[P_k(k=1, 2 \ldots$ . 5)] to simulate a line represented by the equation $y=(\frac{1}{3})x$ connecting two points $P_0$ (0, 0) and $P_6$ (6, 2) may be required. The following Table 1 shows the values of the $x_k$, $y_k$, $f_k$, and $g_k$ from the start point $P_0$ (0, 0) to the point $P_6$ (6,2), adding one to the X coordinates step by step.

TABLE 1

| k | 0 | 1 | 2 | 3 | 4 | 5 | 6 |
|---|---|---|---|---|---|---|---|
| $x_k$ | 0 | 1 | 2 | 3 | 4 | 5 | 6 |
| $y_k$ | 0 | 0 | 1 | 1 | 1 | 2 | 2 |
| $f_k$ $(=1/3\ x_k)$ | 0 | 1/3 =0.333 | 2/3 =0.666 | 1 | 4/3 =1.333 | 5/3 =1.666 | 2 |
| $g_k$ $(=y_k+1/2)$ | 1/2 =0.5 | 1/2 =0.5 | 3/2 =1.5 | 3/2 =1.5 | 3/2 =1.5 | 5/2 =2.5 | 5/2 =2.5 |

Referring to Table 1 and to FIG. 2 $P_0$ is the starting point, with the coordinates ($x_0$, $y_0$) having the respective values (0, 0). The comparative value $g_0$ is $g_0=Y_0+\frac{1}{2}=0+0.5=0.5$. The comparative value $g_0(=0.5)$ is a Y coordinate of a comparative point $c_1$ of a true value $f_1$ on the line $x_1=1$ at requiring the next lattice point $P_1$.

The true value $f_1$ at $x_1=1$ is $f_1=(\frac{1}{3})x_1=\frac{1}{3}=0.333$. In the case where $f_1<g_0$, it is apparent from the equation (10) and FIG. 2 that $y_1=y_0=0$. Namely, the coordinates $(x_1,Y_1)$ of the succeeding lattice point $P_1$ from the point $P_0$ to simulate the line $y=(\frac{1}{3})x$.

Next, the comparative value $g_1$ is determined to be $g_1=y_1+\frac{1}{2}=0+0.5=0.5$.

The coordinates ($x_2$, $y_2$) of the next lattice point $P_2$ at $x_2=2$ must be determined. The true value $f_2$ at $x_2=2$ is $f_2=(\frac{1}{3})x_2=(\frac{1}{3})X2\frac{2}{3}=0.666$. In this case where $f_2>g_1$, it is apparent from the equation (11) and FIG. 2 that $y_2=y_1+1=0+1=1$. The comparative value $g_2$ is determined to be $g_2=y_2+\frac{1}{2}=1+0.5=1.5$. It should be noted that the coordinates of the lattice points $P_3$ through $P_5$ at $x_3(=3)$ $x_5(=5)$ must be determined in the same manner as explained above and as shown in FIG. 2.

As can be seen from the above said explanation the straight line coordinates generator of the prior art requires a decimal point to ascertain the true value $f_k$ and the comparative value $g_k$ and further to compare the decimal values including decimal points of $f_k$ with $g_k$. For these reasons, the straight line coordinates generator circuits must have analog circuits, for instance integrators, to process decimal points. However, it is well known that these analog circuits are complicated, expensive and very slow to process. Although there are some methods which use a microprocessor to process the intelligent functions in firmware, they have proven to be slower than using the analog circuits for processing.

SUMMARY OF THE INVENTION

It is therefore the principal object of this invention to provide a straight line coordinates generator using digital circuits to generate a line more efficiently and rapidly.

It is another object of this invention to provide a straight line coordinates generator using digital circuits to generate all the coordinates for a group of lattice points to simulate a straight line connecting two given points.

It is still another object of the invention to provide a straight line coordinates generator using digital circuits which can handle whole numbers or integers, utilizing less numbers of bits.

In order to obtain the above objects the straight line coordinates generator to determine coordinates of a group of lattice points [$P_k(k=1,2\ldots,n-1)$] for simulating a line to connect two lattice points $P_0(x_0,y_0)$ and $P_n(x_n, y_n)$ on a secondary coordinates face comprises a first adder, a (2Y) register which supplies the first adder with a first input, an ($F_k$) register which supplies the first adder with a second input and stores the result from the first adder in synchronization with a first clock signal, a second adder, a (2X) register which supplies the second adder with a first input, a ($G_k$) register which supplies the second adder with a second input and stores the result from the second adder in synchronization with a second clock signal, a comparator to compare the stored contents of the $G_k$ register with an added result of the first adder, a clock circuit for generating a basic clock signal, a gate circuit which generates the first clock signal from the basic clock signal and a second clock signal in response to the comparator, an ($X_k$) counter to count in synchronization with the first clock signal, a ($Y_k$) counter to count in synchronization with the second clock signal output from the gate circuit, and an initializing means for setting the (2Y) register, the ($F_k$) register, the ($G_k$) register, the ($X_k$) counter and the ($Y_k$) counter with initial values to eliminate decimal points; and a generator device for sequentially generating all of the coordinates of the group of lattice points to simulate the line from the ($X_k$) counter and the ($Y_k$) counter respectively, after initialization.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
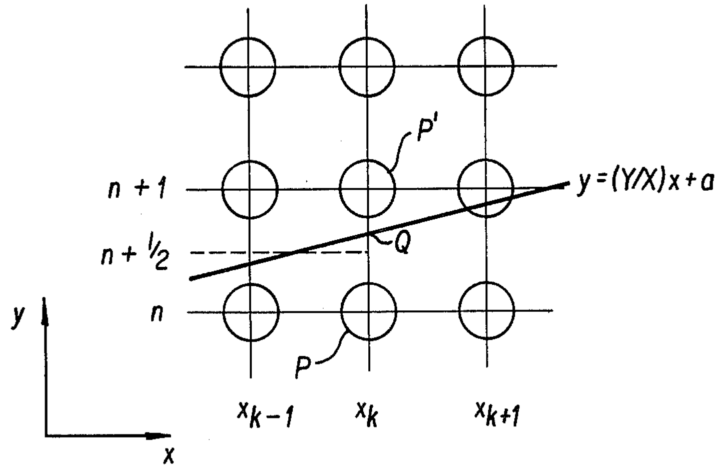
FIG. 1 is a partial view of a secondary axes face having a group of lattice points for explaining the principles of straight line generation.
Figure 2:
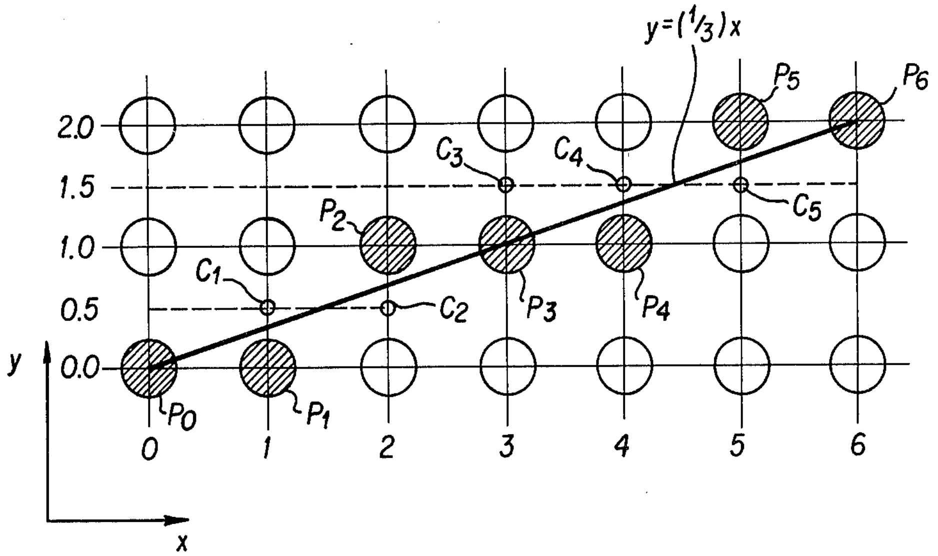
FIG. 2 is a partial view of the secondary axes face of FIG. 1.

Referring now to the drawings, and more particularly to FIG. 1 and FIG. 2, the principle of the present invention will first be explained hereinafter. First, it is necessary to compare the true value $f_k$ of the Y coordinates on the straight line $x=x_k$ with the comparative value $g_{(k-1)}$ of the comparative point $C_k$ at $x=x_k$ in order that all of the coordinates for the group of the lattice points may be determined to the line $y=(Y/X)x+a$ connecting the two points $P_0$ to $P_n$, as explained above. Although the true value $f_k$ is possible to define as $f_k=(Y/X)x_k+a$, the hardware to multiply the X coordinate by the slope each time the x-coordinate is transferred one becomes too complicated. Therefore, the true value should be determined as follows:

The Y coordinate is $f_{(k-1)}=(Y/X)x_k-1+a$ on the line at $x=x_k-1$. Then $f_k-f_{(k-1)}=(Y/X)(x_k-(x_k-1))=Y/X$. Namely, $$f_k=f_{(k-1)}+(Y/X) \quad (12)$$

The true value $f_k$ can be determined only by addition as shown in the above equation (12) if the true value $f_{(k-1)}$ is determined when defining the lattice point $P_{(k-1)}$ and is latched. The comparison of $f_k$ with $g_{(k-1)}$ determines whether the position of the line $y=(Y/X)x+a$ at $x=x_k$ is above the comparative point $C_k$. However, if it is possible to test the position of the line by other methods it is not necessary to compare $f_k$ and $g_{(k-1)}$. Therefore it is considered that a true value $f_k'$ is the distance along the Y axis at $x=x_k$ between the position of the line and the initial point $P_0$ and that a true value $g_{(k-1)}'$ is the distance along the Y axis at $x=x_k$ between the comparative point $C_k$ and the initial point $P_0$. In this case it is apparent that the true value $g0'$ of the comparative point $C_0$ at $x=x_0$ is:

$$g_0'=\tfrac{1}{2} \quad (13)$$

It is also apparent the true value $f_0'$ at $x=x_0$ is:

$$f_0'=0 \quad (14)$$

If the line starts from the point $P_0(x_0, y_0)$, the Y coordinate can be analyzed from the equations (10) and (11) as follows:

$$\text{if } f_k' < g_{(k-1)}' \; y_k = y_{(k-1)} \quad (15)$$

$$\text{if } f_k' \geqq g_{(k-1)}' \; y_k = y_{(k-1)}+1 \quad (16)$$

The true value of $g_k$ is analyzed from the equations (15) and (16) as follows:

$$\text{if } f_k' < g_{(k-1)}' \; g_k' = g_{(k-1)}' \quad (17)$$

$$\text{if } f_k \leqq g_{(k-1)}' \; g_k' = g_{(k-1)}' \quad (18)$$

Furthermore it is also apparent that $$f_k' = f_{(k-1)}' + (Y/X) \quad (19)$$

If the line starts from the point $P_n(x_n, y_n)$, it has to use $k-1$ instead of k from the equation (15) to the equation (19) and has to use $y_{(k-1)}-1$ instead of $y_{(k-1)}+1$ in the equation (16). The case where the line starts from the starting point $P_0(x_0, y_0)$ with no special conditions will now be explained.

Since it is too difficult to perform decimal point operations from the equations (13), (18) and (19) to compare $f_k'$ with $g_k'$ and $f_k$ with $g_{(k-1)}$, a value $F_k$ and a comparative value $G_{(k-1)}$, normalized values of $f_k'$ and $g_{(k-1)}'$, respectively, instead of $f_k'$ and $g_{(k-1)}'$ are introduced. Since the values of $g_k$ ($g_{(k-1)}$) in the equation (17) and (18) are multiples of $\frac{1}{2}$ and the values of $f_k'$ are a multiple of $1/X$, it is possible to prevent the occurrence of decimal points. Two methods A and B can be considered to prevent the occurrence of a decimal point.

In the A method the equations from (13) to (19) are multiplied by a factor of (2X) as follows:

| | | |
|---|---|---|
| | $g_0' \cdot 2X = X$ | (13') |
| | $f_0 \cdot 2X = 0$ | (14') |
| if | $f_k' \cdot 2X < g_{(k-1)}'.2X, \; y_k = y_{(k-1)}$ | (15') |
| if | $f_k' \cdot 2X \geqq g_{(k-1)}'.2X, \; y_k = y_{(k-1)}' + 1$ | (16') |
| if | $f_k' \cdot 2X < g_{(k-1)}'.2X, \; g_k'.2X = g_{(k-1)}'.2X$ | (17') |
| | $f_k' \cdot 2X = f_{(k-1)}'.2X + 2Y$ | (19') |

Whereby if $G_k$ and $F_k$ are introduced as follows:

$$G_k = g_k' \cdot 2X \quad (20)$$

$$F_k = f_k' \cdot 2X \quad (21)$$

The above equations (13') through (19') become:

$$G_0 = X \quad (22)$$

$$F_0 = 0 \quad (23)$$

| | | | |
|---|---|---|---|
| if | $F_k < G_{(k-1)}$ | $y_k = y_{(k-1)}$ | (24) |
| if | $f_k \geqq G_{(k-1)}$ | $y_k = y_{(k-1)} + 1$ | (25) |
| if | $F_k < G_{(k-1)}$ | $G_k = G_{(k-1)}$ | (26) |
| if | $F_k \geqq G_{(k-1)}$ | $G_k = G_{(k-1)} + 2x$ | (27) |
| | $F_k = F_{(k-1)}$ | $+ 2Y$ | (28) |

The occurrence of a decimal point is completely eliminated by this method.

On the other hand, in the B method the equations from (13) to (19) are multiplied by a factor of X as follows:

| | | |
|---|---|---|
| | $g_0' \cdot X = X/2$ | (13") |
| | $f_0' \cdot X = 0$ | (14") |
| if | $f_k' \cdot X < g_{(k-1)}' \cdot X, \; y_k = y_{(k-1)}$ | (14") |
| if | $f_k' \cdot X \geqq g_{(k-1)}' \cdot X, \; y_k = y_{(k-1)} + 1$ | (16") |
| if | $f_k' \cdot X < g_{(k-1)}' \cdot X, \; g_k' \cdot X = g_{(k-1)}' \cdot X$ | (17") |
| if | $f_k' \cdot X \geqq g_{(k-1)}' \cdot X, \; y_k' \cdot X = g_{(k-1)}' \cdot X + X$ | (18") |
| | $f_k \cdot X = f_{(k-1)} \cdot X + Y$ | (19") |

Whereby if $G_k$ and $F_k$ are introduced as follows:

| | |
|---|---|
| $G_k = g_k' \cdot X$ | (29) |
| $F_k = f_k' \cdot X$ | (30) |

The above equations (13") through (19") become:

| | | |
|---|---|---|
| | $G_0 = X/2$ | (31) |
| | $F_0 = 0$ | (32) |
| if | $F_k < G_{(k-1)}, \; y_k = y_{(k-1)}$ | (33) |
| if | $F_k \geqq G_{(k-1)}, \; y_k = y_{(k-1)} + 1$ | (34) |
| if | $F_k < G_{(k-1)}, \; G_k = G_{(k-1)}$ | (35) |
| if | $F_k \geqq G_{(k-1)}, \; G_k = G_{(k-1)} + X$ | (36) |
| | $F_k = F_{(k-1)} + Y$ | (37) |

In this case it is apparent from the equation (31) if X is an odd number the value of $G_0$ must have a decimal point. As a result, the value $G_k$ includes a decimal point. Hereby in the B method if X is an even number $$X' = X/2 \quad (38)$$

and if X is an odd number $$X' = [X-(2_m-1)]/2, \text{ m is integer} \quad (39)$$

the decimal point may be eliminated by following equation (40) instead of the equation (31), $$G_0 = X' \quad (40)$$

In the B method there will be neglegible error in generating coordinates in comparison with the A method or prior art because if X is an odd number, the value $G_k$ is only different from the right value as quantity of compensating by the equation (39). The error m can be made negligible by using a small value for m (for example m=1). In comparison with the A method, the B method can only process approximately half as much data because the equations (13) through (19) are multiplied only by a factor of X. Therefore, the B method is more advantageous than the A method, because it requires a smaller number of bits and the digital circuit architecture operates using less registers.

There will be explained hereunder only the A method, however, the B method being accomplished merely by changing 2X to X and by changing 2Y to Y.

As explained above, the principal to generate straight line coordinates, firstly requires $F_k$ to be calculated from the equation $F_k=F_{(k-1)}+2Y$ by using $F_{(k-1)}$ and $G_{(k-1)}$ obtained from the coordinates $X_{(k-1)}$, $y_{(k-1)}$ of the lattice point $P_{(k-1)}$ at $x=x_{(k-1)}$ to simulate the straight line $y=(Y/X)x+a$. Secondly, the Y coordinate $y_k$ of the lattice point $P_k$ at $x-x_k$ is obtained by testing whether $F_k$ is larger than $G_{(k-1)}$ or not and the next Y coordinate of the lattice point $P_{(k-1)}$ is ascertained by obtaining $G_k$.

Figure 3:
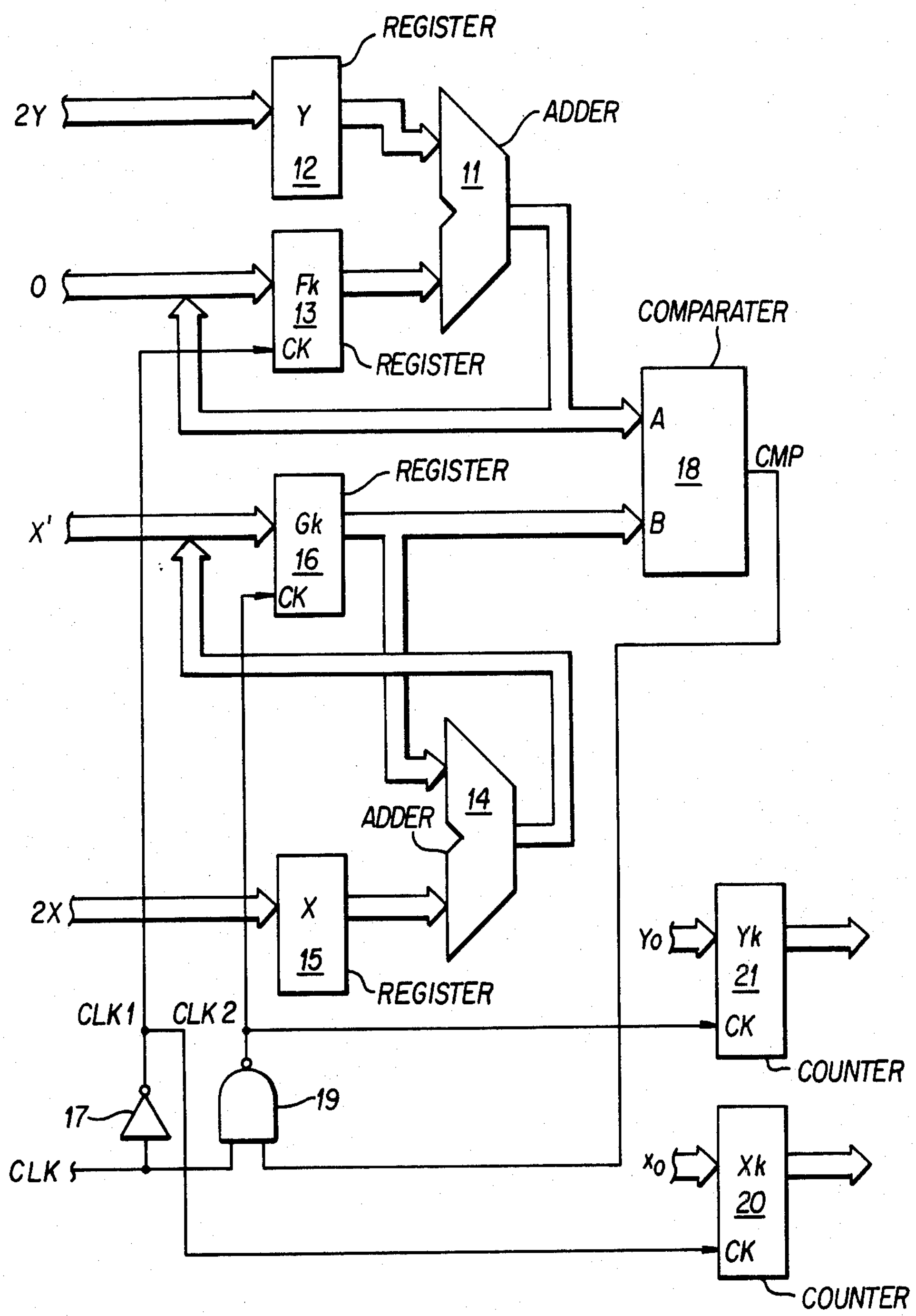
FIG. 3 is a block diagram of one embodiment of the present invention.

Now referring to FIG. 3, one embodiment of the straight line coordinates generator for a graphic display device using a CRT monitor suitable for the invention will be explained. A first adder 11 calculates $F_k$. A 2Y register 12 provides the first adder 11 with one input (2Y). An $F_k$ register 13 provides the first adder 11 with the other input $F_{(k-1)}$. The $F_k$ register stores the result $F_k$ of the first adder 11 and is synchronized by a first clock CLK 1 as mentioned hereinafter. A second adder 14 calculates $G_k$. The 2X register 15 provides the second adder 14 with one input (2X). The $G_k$ register 16 provides the second adder 14 with the other input $G_{(k-1)}$. The $G_k$ register 16 stores the result $G_k$ of the second adder 14 and is synchronized by the second clock $CLK_2$ as mentioned hereinafter. The inverter 17 generates the first clock signal $CKL_1$ by inverting a clock signal from a basic clock CLK. The comparater 18 compares the result ($F_k$) of the first adder 11 with the contents $G_{(k-1)}$ stored in the $G_k$ register 16. In this embodiment, the comparator 18 outputs a compared detecting signal CMP of a logical "1" if $A\geqq B$. A NAND gate 19 makes the detecting signal CMP a logical product with the basic clock CLK to generate the second clock signal $CLK_2$.

The comparator 18 outputs a compared detecting signal CMP of a logical "1" if $A\geqq B$. A NAND gate 19 makes the detecting signal CMP a logical product with the basic clock CLK to generate the second clock signal $CLK_2$.

An $X_k$ counter 20 generates the X coordinates ($x_k$) of the group $[P_k(k=1, 2, \ldots, n-1)]$ of lattice points which simulate the line $y=(Y/X)x+a$ connecting $P_0$ and $P_n$. For instance, the counter 20 is a step up counter synchronized by the first clock signal $CLK_1$. The $Y_k$ counter 21 generates the Y coordinates ($y_k$) of the group of lattice points defined above. For instance, the counter 21 is a step up counter synchronized by the second clock signal $CLK_2$.

Figure 4:
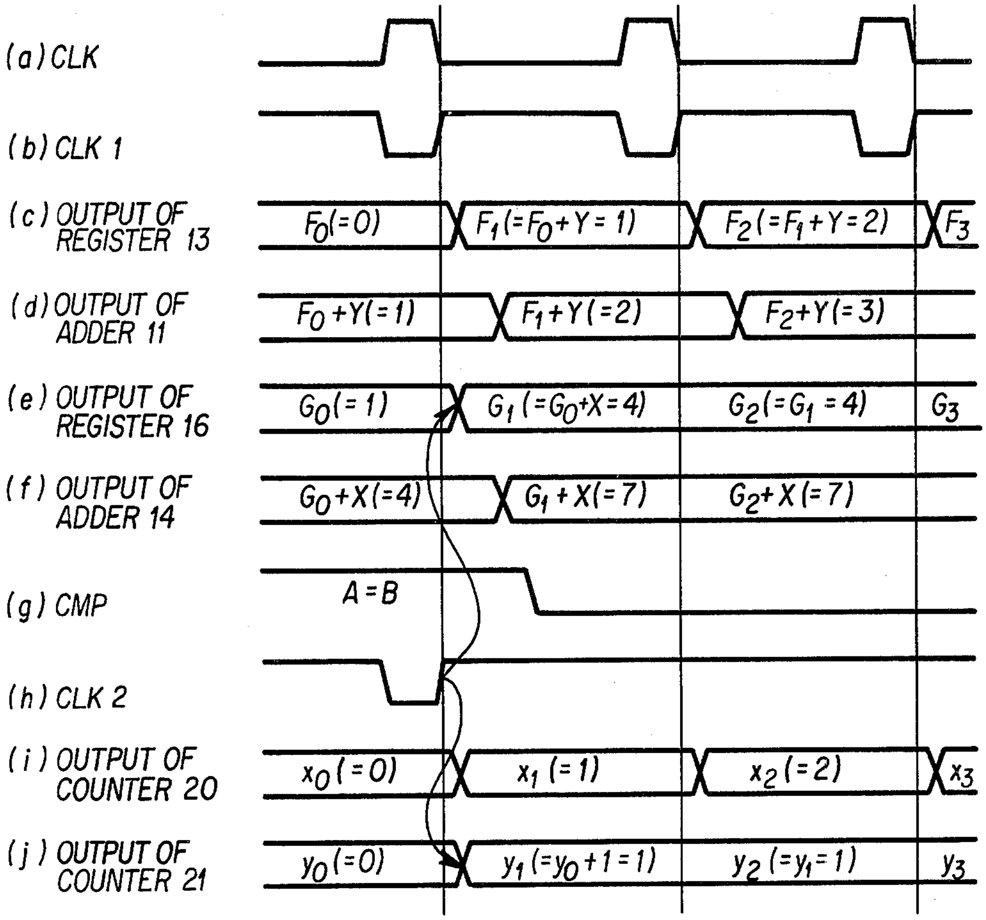
FIG. 4 is the timing chart for the block diagram of FIG. 3.

Referring now to FIG. 4, the timing chart is provided to explain hereinunder the operations of the embodiment of this invention to obtain all of the coordinates ($x_k$, $y_k$) of the group $[P_k(k=1, 2, \ldots, 5)]$ of the lattice points simulating the line $y=(\frac{1}{3})x$ and connecting the two points $P_0(0, 0)$ and $P_6(6, 2)$. In this embodiment all of the lattice points $P_k$ ($x_k$, $y_k$) from the starting point $P_0$ (0, 0) to the terminated point $P_6$ (6, 2), in addition to the incremented X coordinates, are shown as $x_k$, $y_k$, ($f_k$), $F_k$, $G_k$ in the following Table 2.

TABLE 2

| k | 0 | 1 | 2 | 3 | 4 | 5 | 6 |
|---|---|---|---|---|---|---|---|
| $x_k$ | 0 | 1 | 2 | 3 | 4 | 5 | 6 |
| $y_k$ | 0 | 0 | 1 | 1 | 1 | 2 | 2 |
| $f_k$ ($=1/3\cdot x_k$) | 0 | 1/3 | 2/3 | 1 | 4/3 | 5/3 | 2 |
| $F_k$ | 0 | 2 | 4 | 6 | 8 | 10 | 12 |
| $G_k$ | 3 | 3 | 9 | 9 | 9 | 15 | 15 |

When the straight line coordinates generator starts, a microprocessor or a host computer (not shown) sets initial values to the counters 20 and 21 and the registers 12, 13, 15 and 16. The counters 20 and 21 in this case, are set at the respective coordinates of the starting point. Namely, $x_0$ and $y_0$ are set in the counter 20 and 21 as shown in the timing charts (i) and (j) of FIG. 4. On the other hand, it sets 2Y ($=2X1=2$) and 2X ($=2X3=6$) to the respective registers 12 and 15, because the slope of the line connecting $P_0$ (0, 0) and $P_6$ (6, 2) is $Y/X=\frac{1}{3}$. Although it doesn't matter that Y is $Y=y_6-y_0=2$ and X is $X=x_6-x_0=6$, the complexity caused by an increase in the number of bits of the registers 12, 13, 15 and 16, the adders 11 and 14, and the comparator 18 must be considered. Furthermore, the values for $F_0$ and $G_0$ are set in the respective registers 13 and 16 as shown in the timing charts (c) and (e) of FIG. 4. The initial values are $F_0=0$ and $G_0=X(=3)$ obtained from the equations (23) and (22).

The adder 11 adds the contents $F_0(=0)$ from the register 13 to the contents $2Y(=2)$ from the register 12 so that it obtains a value $F_1$ namely $F_0+2Y(=2)$ as shown in timing chart (d) of FIG. 4. The adder 11 outputs the result $F_0+2Y$ ($=2$) to the input of register 13 and to the A input of the comparator 18. The adder 14 adds the contents $G_0$ ($=3$) from the register 16 to the contents 2X ($=6$) from the register 15 and obtains $G_0+2X$ ($=9$) as shown in timing chart (f) of FIG. 4. The adder 14 outputs its result $G_0+2X$ ($=9$) to the input of the register 16. At this time, the contents $G_0$ ($=3$) of the register 16 is output to the B input of the comparator 18. The comparator 18 compares the A input with the B input. Namely the comparator 18 compares $F_0+2Y$ ($=2$) with $G_0$ ($=3$). In this case, since $A<B$, the comparator 18 doesn't output the compared detecting signal CMP of a logical "1" as shown in (g) of FIG. 4.

After the completion of the initialization period for the counters 20 and 21, and the registers 12, 13, 15 and 16, a controller generates the basic clock signal CLK as shown in timing chart (a) of FIG. 4. After the basic clock CLK is inverted by the inverter 17, it is input to the register 13 and the counter 20 as the first clock signal $CLK_1$, as shown in timing chart (b) of FIG. 4. Therefore, the contents $x_0(=0)$ of the counter 20 are incremented $+1$ and $x_1=x_0+1$ as shown in timing chart (i) of FIG. 4. The basic clock CLK is also input to the NAND gate 19. But the NAND gate 19 doesn't output the second clock signal $CLK_2$ because of a lack of a NAND condition because the comparator 18 is not outputting the compared detecting signal CMP of a logical "1" as shown in timing chart (h) of FIG. 4. Therefore the counter 21 does not operate as shown in (j) of FIG. 4 even though the counter 20 operates as shown in timing chart (i) of FIG. 4. Therefore, the Y coordinate $y_1$ of the lattice point $P_1$ at $x=x_1$ is the same as Y coordinate $y_0(=0)$ of the point $P_0$.

The register 13 stores the result $F_1=F_0+2Y(=2)$ of the adder 11 synchronized with the first clock signal $CLK_1$ as shown in timing chart (c) of FIG. 4, at the same time the counter 20 is incremented to $x_0=x_0+1$. Since the second clock signal $CLK_2$ is not generated at that time as mentioned above in the discussion of timing chart (h) of FIG. 4, the register 16 keeps its contents of $G_0(=3)$ as shown in timing chart (e) of FIG. 4. Namely, $G_1$ equals to $G_0$. Next, the adder 11 adds the contents $F_1(=2)$ of the register 13 to the contents $2Y(=2)$ of the register 12 to obtain $F_2=F_1+2Y(=4)$ as shown in the timing chart (d) of FIG. 4. The adder 11 outputs the result $F_1+2Y(=4)$ to the register 13 and to the comparator 18 as an A input. The adder 14 adds a content $G_1(=G_0=3)$ of the register 16 with a content $2X(=6)$ of the register 15 to obtain $G_1+2X(=9)$ as shown in (f) of FIG. 4. The adder 14 outputs the result $G_1+2X(=9)$ to the register 16 wherein the contents $G_1(=3)$ of the register 16 becomes the B input of the comparator 18. The comparator 18 compares the A input $F_2=F_1+2Y(=4)$ with the B input $G_1(=3)$. In the case $F_2>G_1$ and $A>B$, the comparator 18 outputs the compared detecting signal CMP of a logical "1" as shown in timing chart (g) of FIG. 4. The NAND gate 19 in responding to the compared detecting signal CMP, and the output from the basic clock CLK outputs the second clock signal $CLK_2$ as shown in timing chart (h) of FIG. 4 while CMP=1. The second clock signal $CLK_2$ is input to the counter 21 and the register 16. The counter 21 then increments its contents from $y_1(=0)$ to 1 as shown in timing chart (j) of FIG. 4. This becomes the value for the Y coordinate $y_2$ of the lattice point $P_2$. The register 16 stores the result $G_1+2X(=9)$ of the adder 14 as shwon in timing chart (e) of FIG. 4, which becomes the value of $G_2$. However, the first clock signal $CLK_1$ is input to the counter 20 and the register 13. Thus, the counter 20 operates at the same time as the counter 21 and increments its content $x_1(=1)$ as shown in timing chart (i) of FIG. 4. The x coordinate of the lattice point $P_2$ becomes $X_2(=2)$. The register 13 also stores the result $F_2=F_1+2Y(=4)$ from the adder 11.

The coordinates of the remaining lattice points $P_3$ through $P_6$ can be acquired in the same manner as explained above by repeating renewal of the contents of the registers 13 and 16 to determine the coordinates of the lattice point $P_k$ based on the comparison of $F_k$ with $G_{(k-1)}$ as shown in Table 2. It is apparent from the embodiment that the architecture of the straight line coordinate generator enables the use of extremely simple digital circuits to efficiently and rapidly generate all the coordinates $(x_k, y_k)$ of a group of lattice points to simulate the line $y=(\frac{1}{3})x$ connecting the two points $P_0(0, 0)$ and $P_6(6, 2)$ without the necessity of using decimal points. This invention is acceptable for all straight lines having a slope Y/X, where $0 \leqq Y/X \leqq 1$.

Although in the aforesaid embodiment a method starting from the point $P_0$ was explained, it is possible to acquire all of the lattice points by decrementing the X and Y coordinates from a starting point such as $P_6$ in the above example. In this case step down counters are necessary to replace step up counters 20 and 21. It is also possible to change count directions in accordance with which starting point is selected from two points by using both step up and step down counters.

$F_k$ is a normalized value, obtained by multiplying $f_k'$ by 2X, of the distance in the y direction between the point $P_0$ and the line $y=(Y/X)x+a$ at $x=x_k$. $G_{(k-1)}$ is also a normalized value, obtained by multiplying $g_{(k-1)}'$ by 2X, of the distance in the y direction between the comparative point $C_k$ and the point $P_0$ at $x=x_k$. In this case, $F_0$ and $G_0$ are steady values independent of the coordinates of the starting value $P_0$ which is apparent from the equations 23 and 22.

On the other hand, it is also possible to acquire $F_k$ and $G_k$ by multiplying the y coordinate $f_k$ on the line $y=-(Y/X)x+a$ at $x=x_k$ and the y coordinate $y_k$ of the comparative point $C_k$ at $x=x_k$ by 2X. In this case, $F_0$ and $G_0$ are variable in accordance with the coordinates of the starting point because they include elements of the coordinates of the starting point $P_0$. It also becomes necessary for the adders 11 and 14 to perform subtraction if the point $P_6$ is selected as the starting point.

Although the above mentioned embodiment has been explained in conjunction with using a graphic display apparatus using a CRT monitor, it should also be noted that the invention is readily adaptable for an X−Y plotter using the equivalent principal.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A new and improved straight line coordinate generator to determine and generate the coordinates of a group of lattice points $[P_k(k=1, 2, \ldots, n-1)]$ to simulate an actual line defined by connecting the two lattice points $P_0(x_0, y_0)$ and $P_n(x_n, y_n)$, on a secondary coordinates face, comprising:
   - first adder means for generating a first normalized y-coordinate result;
   - first register means, electrically connected to said first adder means, for supplying said first adder means with a first decimal eliminating value;
   - second register means, electrically connected to said first adder means, for supplying said first adder means with a first y-coordinate distance value and for storing the results of said first adder means;
   - second adder means for generating a second normalized y-corrdinate result;
   - third register means, electrically connected to said second adder means, for supplying said second adder means with a second decimal eliminating value;
   - fourth register means, electrically connected to said second adder means, for supplying said second adder means with a second y-coordinate distance value and for storing the results of said second adder means;
   - comparator means, electrically connected to said first adder means and said fourth register means, for comparing the stored contents of said fourth register means with the results of said first adder means;
   - clock means for generating a basic clock signal;
   - gate circuit means, electrically connected to said comparator means, said clock means, said second register means and said fourth register means, for generating a first clock signal from said basic clock signal and a second clock signal in response to a logic signal from said comparator means, said second register means synchronized by said first clock signal and fourth register means synchronized by said second clock signal;

x-coordinate counter means, electrically connected to said gate circuit means, for determining x-coordinate values in synchronization with said first clock signal;

y-coordinate counter means, electrically connected to said gate circuit means, for determining y-coordinate values in synchronization with said second clock signal;

initializing means, electrically connected to each register means, for setting said first register means, said second register means, said third register means and said fourth register means with initial values whereby the use of decimal points is eliminated;

a generating means, electrically connected to said x-coordinate counter means and said y-coordinate counter means for sequentially generating each x and y coordinate of said group of lattice points to simulate said line, in response to said x-coordinate counter means and said y-coordinate counter means.

2. A new and improved straight line coordinates generator to determine and generate the coordinates of a group of lattice points [$P_k$ (k=1, 2, . . . , n−1)], for simulating a line to connect two lattice points Po (xo, yo) and $P_n(X_n, Y_n)$, on a secondary coordinates face as set forth in claim 1, wherein:

said initializing means sets said first register means with a normalized value equal to twice the value of the Y component of the line slope equation Y/X, sets said third register means with a normalized value equal to twice the value of the X component of the line slope equation Y/X, sets said second register means to zero, sets said fourth register means to a value equal to the X component of the line slope equation, sets said x-coordinate counter means with the X-coordinate $x_0$ or $X_n$ of said respective point $P_0$ or $P_n$ and sets said y-coordinate counter means with the Y-coordinate $Y_0$ or $Y_n$ of said respective point $P_0$ or $P_n$.

3. A straight line coordinates generator to determine and generate the coordinates of a group of lattice points [$P_k$(k=1, 2, . . . , n−1)], for simulating a line to connect two lattice points $P_0(x_0, y_0)$ and $P_n(x_n, y_n)$, on a secondary coordinates face as set forth in claim 1, wherein:

said initializing means sets said first register means with a normalized value equal to the Y component of the line slope equation Y/X, sets said third register means with another normalized value equal to the X component of the line slope equation Y/X, sets said second register means to zero, sets said fourth register means with another normalized value equal to one-half the value of the x component of the line slop equation Y/X if X is even or with another normalized value equal to [X−(2m−1)]/2 where x is the x component of the line slope equation Y/X if X is odd, sets said x-coordinate counter means with the X-coordinate $x_0$ or $x_n$ of said respective point $P_0$ or $P_n$ and sets said y-coordinate counter means with the Y coordinate $y_0$ or $y_n$ of said respective point $P_0$ or $P_n$.

4. A straight line coordinate generator according to claim 3, wherein:

m is equal to one.

5. A straight line coordinates generator according to claim 1, further comprising:

display means, electrically connected to said generating means, for displaying said simulated line.

6. A straight line coordinates generator according to claim 5, wherein said display means is a cathode ray tube monitor.

7. A straight line coordinates generator according to claim 5, wherein said display means is an X−Y plotter.

* * * * *